Oct. 17, 1933.   G. D. SUNDSTRAND   1,931,171
FEED MECHANISM FOR MACHINE TOOLS
Filed March 22, 1930   2 Sheets-Sheet 1
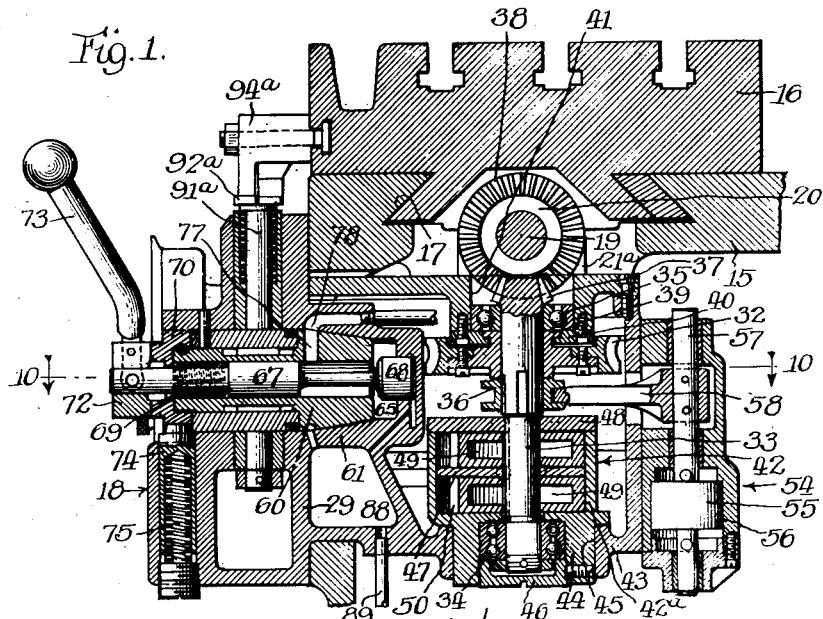
Fig. 1.
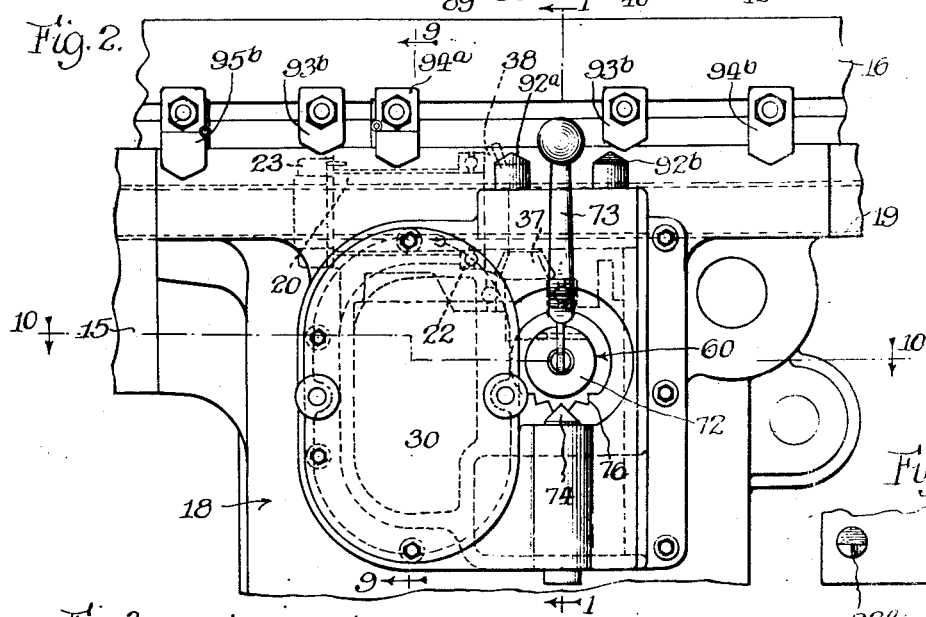
Fig. 2.
Fig. 15.
Fig. 3.  Fig. 4.  Fig. 5.  Fig. 6.  Fig. 7.  Fig. 8.
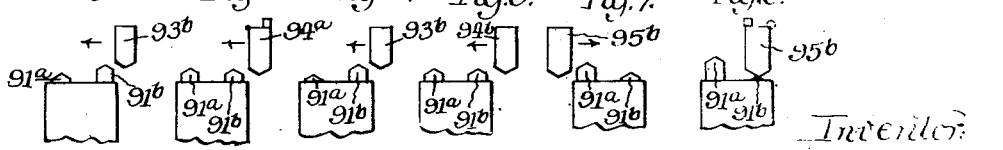
Inventor:
G. D. Sundstrand,

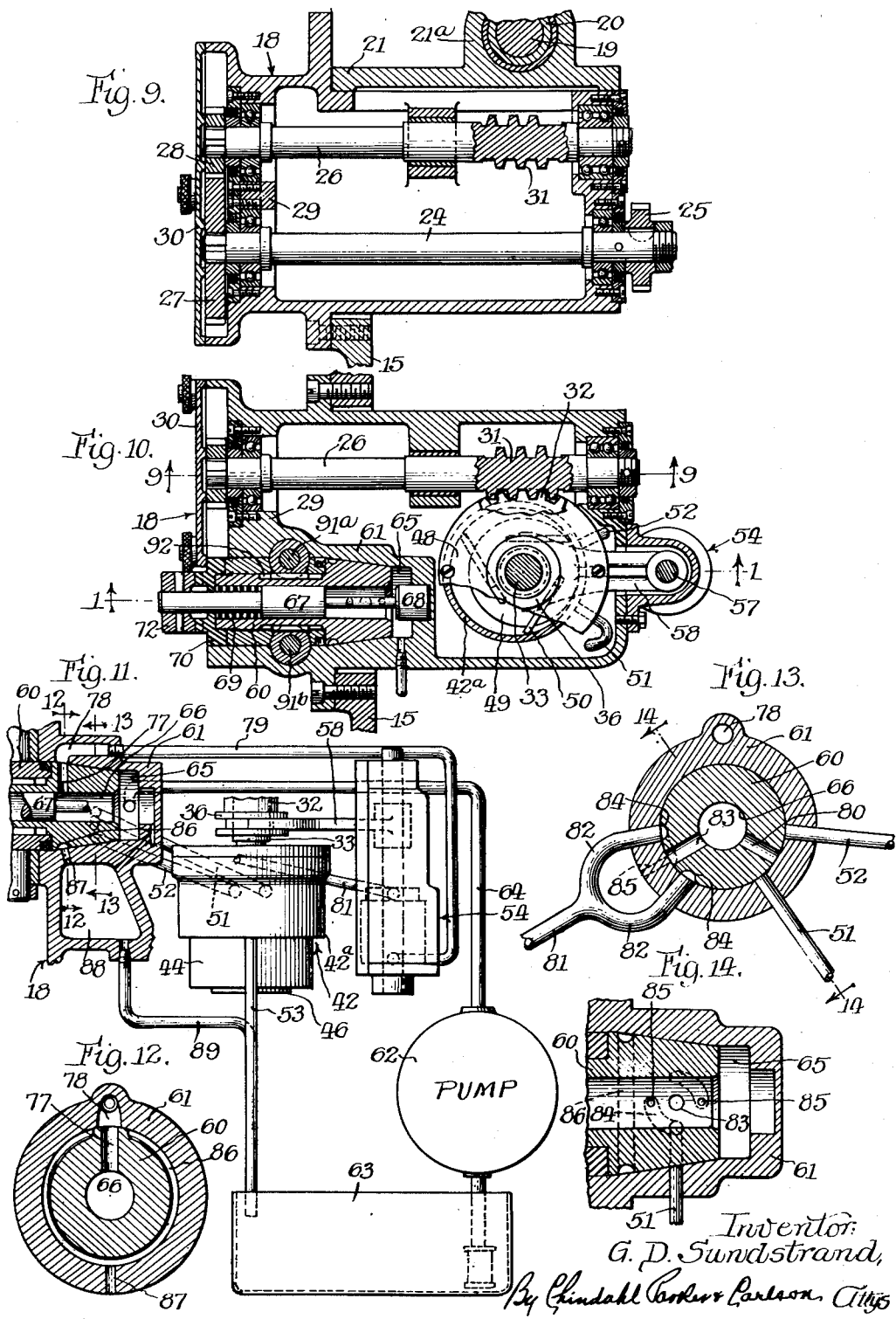

Patented Oct. 17, 1933

1,931,171

UNITED STATES PATENT OFFICE 1,931,171

FEED MECHANISM FOR MACHINE TOOLS

Gustaf David Sundstrand, Rockford, Ill., assignor to Sundstrand Machine Tool Company, Rockford, Ill., a corporation of Illinois Application March 22, 1930. Serial No. 438,007

15 Claims. (Cl. 90—21)

The invention relates generally to feeding mechanism for a movable tool or work support and more particularly to an improved mechanism for actuating and controlling the movements of the tool or work support in a machine tool.

It is the general object of the invention to provide an improved and simplified actuating mechanism for a movable support of a machine tool having mechanical means for moving the support at "feed" speeds together with hydraulic means for moving the support in forward and reverse directions at a "traverse" speed.

Another object is to provide such a mechanical feed and hydraulic traverse mechanism embodying improved and simplified control means whereby various combinations of movements may be imparted to the support either automatically or under manual control.

The invention has for another object the provision of such a feeding mechanism and a control mechanism therefor of such a nature that the hydraulic actuating means, the mechanical actuating means, and the control means may be arranged compactly in a single feed box which may be separately assembled and then mounted in the bed of a machine and which may be removed as a unit from the machine bed for purposes of inspection, repair or replacement.

These and other objects are attained in the present embodiment by providing a support operatively connected to a feed shaft for movement thereby, disconnectible mechanical actuating means for rotating the shaft to impart feeding movements to the support, reversible hydraulic actuating means for the shaft, hydraulic means for governing the connection of the mechanical feeding means with said shaft, and a unitary valve mechanism arranged to control all of said hydraulic means either manually or automatically.

Other objects and advantages will become apparent from the following description taken in connection with the accompanying drawings, in which:

Fig. 1 is a fragmentary vertical sectional view of an actuating mechanism embodying the invention in its preferred form as applied to a milling machine, the section being taken along the line 1—1 of Figs. 2 and 10.

Fig. 2 is a fragmental front elevational view of the machine shown in Fig. 1.

Figs. 3 to 8 are diagrammatic views showing the positions of the trip elements at various points in an exemplary automatic cycle of support movement used in a so-called "skip-feed" milling operation.

Fig. 9 is a fragmentary vertical section taken along the line 9—9 of Figs. 2 and 10.

Fig. 10 is a plan section taken along the line 10—10 of Fig. 1, with a portion of the hydraulic motor casing broken away to show the internal construction thereof.

Fig. 11 is a sectional view of the control valve showing diagrammatically the hydraulic circuits leading therefrom.

Fig. 12 is a transverse sectional view of the control valve taken along the line 12—12 of Fig. 11.

Fig. 13 is a transverse sectional view of the valve taken along the line 13—13 of Fig. 11, the hydraulic connections being shown diagrammatically.

Fig. 14 is a longitudinal sectional view of the valve taken along the line 14—14 of Fig. 13.

Fig. 15 is a fragmental plan view showing the control plungers.

For purposes of disclosure the preferred form of the invention is illustrated in the drawings and will hereinafter be described in detail as applied to a particular form of actuating mechanism for a milling machine, but it is to be understood that this disclosure is not intended as a limitation of the invention to this type of machine tool, it being contemplated that various changes might be made by those skilled in the art to adapt the invention to this and other types of tools without departing from the spirit and scope of the invention as defined by the appended claims.

As herein illustrated the invention in its preferred form is embodied in a milling machine having a bed 15 upon which a movable support in the form of a table 16 is supported and guided for reciprocation along ways 17. The actuating or feeding mechanism for reciprocating the table 16 is preferably embodied in a feed box or housing 18 mounted in the bed beneath the table 16 and extending forwardly beyond the bed so as to provide for the mounting of a suitable control mechanism directly on the feed box.

The table 16 may be reciprocated by means such as a feed screw 19 mounted on the lower side of the table and in screw threaded engagement with a nut 20 mounted in fixed relation to the bed. In the present case the screw 19 is normally held against rotation and the nut 20 is in the form of a sleeve rotatably mounted in a block 21ᵃ on the removable top 21 of the feed box 18 (Figs. 1, 2 and 9), the nut being held against longitudinal displacement by thrust bearings 22 and 23 at opposite ends thereof. Thus, by rotation of the nut 20 in forward and reverse directions, the table 16 may be reciprocated.

The present invention provides for mechanical actuation of the movable support at feed speeds and for movement of the support at traverse speeds by hydraulically operated means, and power for driving both the hydraulic and the mechanical elements of the mechanism is preferably derived from the prime mover (not shown) of the machine. As shown in Fig. 9, the means for mechanically feeding the table 16 includes a horizontal shaft 24 extending from front to rear in the feed box 18 adjacent a lower corner thereof and rotatably journaled in the front and rear walls of the box. At its rear end the shaft 24 extends through the wall of the box 18 and has a pinion 25 fixed thereon through which the shaft may be actuated from the prime mover (not shown).

Such actuation ordinarily will be at a constant speed in one direction and in order that differently speeded feeding movements may be imparted to the table 16, the constant speed rotation of the shaft 24 is transmitted to a parallel shaft 26 through suitable intermeshing change gears 27 and 28 mounted on the shafts 24 and 26 respectively. The shaft 26 is, in the present instance, mounted in the feed box 18 directly above the shaft 24 with its ends similarly journaled in the front and rear walls of the box, and to receive the change gears 27 and 28, the splined forward ends of the shafts project through the forward wall 29 of the feed box, and are concealed by a removable plate 30.

Adjacent the rear wall of the feed box 18 and directly beneath the feed screw 19, a worm 31 (Figs. 9 and 10) is formed on the shaft 26, the worm being in constant engagement with a horizontally positioned worm wheel 32 mounted within the feed box. The worm wheel 32 is, in the present instance, loosely mounted on a vertical feed shaft 33 which is rotatably supported within the feed box 15 by suitable bearings 34 and 35 mounted in the bottom wall and the top 21 of the feed box. To connect the worm wheel 32 with the feed shaft 33 so as to transmit rotative movement thereto, a clutch 36 splined on the shaft 33 may be moved upwardly to the position shown in Fig. 1 so as to interengage suitable teeth formed on the two members. Such rotation is transmitted to the rotatable nut 20 through a bevel gear 37 (Figs. 1 and 2) formed on the upper end of the shaft 33 and engaging a similar gear 38 on the adjacent end of the nut 20. Thus, the table 16 may be given positive feeding movements under the control of the clutch 36 and the speed of such movements may be readily varied by substituting different change gears 27 and 28.

In order to provide vertical support for the worm gear 32 when the clutch 36 is moved downwardly to its disengaged position, the gear 32 has an annularly grooved central hub 39 (Fig. 1) into the groove of which the semi-circular edge of a plate 40 projects. The plate 40 is detachably secured to the downwardly flanged edge of an opening 41 in the top 21 of the feed box, the upper bearing 35 of the feed shaft being positioned within the opening and supported by the plate 40.

The hydraulic actuating means whereby the table is moved at a rapid traverse speed in forward and reverse directions is also mounted within the feed box 18. The hydraulic means, in the form herein shown comprises a hydraulically actuated rotary motor 42 operable in reverse directions and positioned within the feed box 18 about the lower end of the feed shaft 33. The motor casing 42ª, which is cylindrical in form, rests on the bottom wall 43 of the feed box 18 and has a hub 44 projecting downwardly in snugly fitting relation into an opening 45 in the bottom wall. The lower end of the hub 44 is counterbored to receive the lower bearing 34 of the shaft 33 and a cap 46 screw threaded into the counter-bore serves to support the bearing therein.

The cylindrical walls of the casing 42ª are eccentrically positioned with respect to the hub 44 and the shaft 33, as shown in Figs. 1 and 10, and by providing a transverse wall 47 and a top plate 48, two eccentric chambers are formed in the casing about the shaft 33. In each of the chambers a rotor 49 is secured upon the shaft 33, each of the rotors having a plurality of slidable vanes 50 therein arranged to be pressed outwardly into contact with the cylindrical wall of the casing 42ª. In the present case, each vane 50 is disposed at an angle to a radius extending from the shaft 33, and the vanes in the two rotors 49 are oppositely positioned.

By means of pressure fluid supplied through a supply pipe 51 connected to the upper motor chamber at an approriate point (Fig. 10), the upper rotor 49 may be actuated to rotate the feed shaft 33 in one direction while a second supply pipe 52 connected to the lower chamber at a different angular position will serve to supply fluid for moving the lower rotor 49 so as to rotate the feed shaft in the opposite direction. Suitable discharge openings (not shown) are provided in the two chambers through which fluid may be discharged into a drain pipe 53 (Fig. 11). Thus when the clutch 36 is disengaged from the constantly rotating worm wheel 33, the table 16 may be moved at rapid traverse rate in either direction.

For the purpose of engaging the clutch 36 to effect feeding movement of the table or disengaging it to permit rapid traverse movement of the table, the present invention preferably employs pressure fluid operated means, which means may be in the form of a double acting piston and cylinder device 54 (Figs. 1, 10 and 11). This device comprises an elongated housing detachably secured on the rear wall of the feed box 18 and having a piston 55 mounted in a vertically extending cylinder 56 formed therein. The piston 55 has a piston rod 57 slidable up and down with the piston in suitable bearings in the housing and a laterally projecting arm 58, secured to the piston rod 57 and projecting through an opening in the feed box 18, engages a suitable annular groove in the clutch 36 so as to form a shifting yoke for the clutch.

For the purpose of controlling the position of the clutch 36 and the mechanical actuation of the table 16 at feed speed, as well as for controlling the operation of the hydraulic traverse motors, a unitary control valve 60 (Figs. 1, 10 and 11) is preferably employed, the valve being mounted for oscillation about a horizontal axis in a valve casing 61, formed integrally with the feed box 18 and at the forward side thereof.

It is contemplated that a continuous supply of pressure fluid will be provided by a pump such as 62, mounted in the bed and driven continuously from the prime mover by conventional means (not shown) so as to draw fluid from a supply tank 63 and force it under pressure through a pipe 64 (Fig. 11) into a chamber 65 within the valve casing 61 at the rear end of the valve member 60. The pump 62 preferably embodies a pressure relief means (not shown) to bypass excess fluid. From the chamber 65, the pressure fluid passes forwardly into an axial bore 66 formed in the valve, and from the bore, the fluid is distributed in accordance with the position of the valve. Preferably, means is embodied in the value structure for controlling the quantity of pressure fluid which may flow therethrough so that the speed of the traverse movement may be regulated by the operator. In the form shown, this means comprises a throttle member 67 slidable axially in the bore 66 and having an enlarged head 68 in the chamber 65 which may be moved toward and away from the end of the bore to vary the effective area of the opening. The head 68 is guided in a socket in the rear end wall of the valve casing 61 and the throttle member is normally held in its rearward or open position by an expansive spring 69 surrounding the reduced forward end of the member 67 and acting between the enlarged central section thereof and a hub 70 surrounding the end of the member 67 and pinned to the forward end of the valve member 60.

A single control handle is provided for operating the throttle member 67 and shifting the valve 61 to various positions and to this end a radially slotted collar 72 (Figs. 1 and 2) is positioned on the slotted forward end of the throttle member. A control handle 73 is mounted on the collar 72 with one end positioned in the slots in the collar and the throttle member, and is pivotally connected at spaced points to the collar 72 and the throttle member. Thus by moving the upper end of the handle 73 rearwardly (to the right in Fig. 1) the throttle member 67 may be moved forwardly against the spring 69 so as to reduce the amount of pressure fluid flowing through the valve. The handle 73 may also be used to oscillate the valve 60 about its longitudinal axis, and to hold it in any one of a plurality of positions, a detent plunger 74 (Figs. 1 and 2) is mounted beneath the hub 70 and is pressed upwardly by a spring 75 so that its pointed upper end will engage one of a plurality of suitable notches 76 formed at spaced points about the edge of the hub.

The present embodiment of the invention provides for five different positions of the control handle 73, within its range of oscillatory movement, the two positions at the extreme ends of this range being "stop" positions wherein both of the actuating means for the table are rendered ineffective, the central position (shown in Figs. 1 and 2) being the "feed" position, and the two intermediate positions being right and left hand "traverse" positions. The valve 60 therefore, has a radial port 77 (Figs. 1 and 12) arranged, when the control handle is in its feed position, to register with a passage 78 in the valve casing so that pressure fluid may pass therethrough to a pipe 79 (Fig. 11) connected to the lower end of the cylinder 56, whereby the piston is actuated to engage the clutch 36 and cause positive feeding movement of the support.

For the purpose of obtaining rapid traverse movement of the support when the valve is in one of its intermediate or "traverse" positions, the pipes 51 and 52 are connected to the valve casing 61 at peripherally spaced points (Figs. 11, 13 and 14) so that when the valve is in one traverse position, a radial port 80 in the valve will register with the pipe 51 whereby to permit pressure fluid to pass to the upper chamber of the motor 42, while in the other traverse position the port 80 will register with the pipe 52 so that the rotor 49 in the lower motor chamber will be actuated. Thus the feed shaft 33 will be rotated by the hydraulically actuated traverse means in either forward or reverse direction according to the position of the control handle.

In order to insure that the feed clutch 36 will be disengaged when the control handle is positioned for rapid traverse, the upper end of the clutch control cylinder 56 is connected to the valve casing by means of a pipe 81 (Figs. 11, 13 and 14). At the valve casing, the pipe 81 has two branches 82 spaced peripherally about the casing (shown diagrammatically in Fig. 13) so that when the valve is in either traverse position, a radial port 83 in the valve will register with one of the branches 82 and pressure fluid will pass through the pipe 81 to cause disengagement of the clutch 36. A pair of arcuate grooves 84 in the outer surface of the valve 60 are arranged to establish communication between the branches 82 and a pair of outlet ducts 85 in the casing 61 when the valve is in its feed position so that the fluid may escape from the upper end of the cylinder 56.

Fluid may be similarly discharged from the lower end of the cylinder 56 when the valve is in its "traverse" or "stop" positions through circumferentially extending grooves 86 in the valve 60 (Figs. 11, 12 and 14) alined with the passage 78 in the valve casing and arranged to communicate therewith at all times except when the valve is in its feed position. A duct 87 in the bottom of the valve casing 61 (Figs. 11 and 12) permits flow of the fluid from the groove 86 into an overflow chamber 88 formed beneath the valve casing, and from the chamber 88, the fluid is conducted to the supply tank 63 through a drain pipe 89 (Figs. 1 and 11).

Thus, by movement of the valve 60 to its various positions, the operator may cause the support 16 to be moved at feed speed in one direction, or at traverse speed in either direction and the invention as herein shown provides trip means for automatically moving the valve so as to obtain various combinations of such support movements. In the present form this trip means comprises a pair of trip elements in the form of plungers 91$^a$ and 91$^b$ (Figs. 1 to 8 and 10) mounted for vertical movement on opposite sides of the valve 60 and each having a rack thereon engaging a pinion 92 formed on the valve 60. Thus, by applying downward pressure to one or the other of the plungers, the valve may be rotated to any desired position. To accomplish this result automatically during movement of the support 16, suitable trip dogs are employed. These trip dogs are adjustably mounted on the forward side of the support and in order that the plungers 91$^a$ and 91$^b$ may be engaged selectively to rotate the valve 60 in the desired direction, the pointed upper end 92$^a$ of the plunger 91$^a$ lies in a plane positioned forwardly of the pointed end 92$^b$ of the plunger 91$^b$.

The trip dogs employed are arranged to project downwardly different distances so as to cause rotation of the valve 60 to different positions. Thus, feed dogs 93$^b$ are of such a length and construction that the pointed lower end of the dog will engage the plunger 91$^b$ to move it downwardly to the level shown in Figs. 1, 2, 4, and 6, so that the two plungers 91$^a$ and 91$^b$ are at the same level and the valve is in its central or feed position. To move the plungers from this position to one of the traverse positions shown in Figs. 3, 5 and 7, traverse dogs 94$^a$ and 94$^b$ are provided, these dogs being slightly longer than the feed dogs as shown in Fig. 2, the dog 94$^a$ being arranged to engage the plunger 91$^a$ and the dog 94$^b$ to engage the plunger 91$^b$. A stop dog 95$^b$ which is slightly longer than the traverse dogs may be used to engage the plunger 91$^b$ to move it from the traverse position shown in Fig. 7 to the "stop" position of Fig. 8. It will be understood that similar feed and stop dogs may be provided for engaging the plunger 91$^a$.

In Fig. 2 an exemplary set-up of trip dogs is shown arranged to obtain a skip-feed cycle of support movement consisting of five stages, i. e. (1) rapid approach movement to the left (Fig. 2), (2) feed to the left, (3) rapid approach followed by (4) a second feeding movement to the left, and (5) rapid return (to the right). At the end of the return movement the support is automatically stopped so that the cycle may again be manually initiated by the control handle 73.

Thus, when the rapid approach movement of the support (to the left) has been manually initiated by movement of the control handle 73, the plungers 91$^a$ and 91$^b$ will stand in the positions shown in Fig. 3 and the feed dog 93$^b$ will move toward the plungers as indicated by the arrow. When the support has advanced a predetermined distance at traverse speed, the feed dog 93$^b$ will engage and depress the plunger 91$^b$ so as to move the valve 60 to its feed position. The plungers will then occupy the position shown in Fig. 4 and the traverse dog 94$^a$ will be approaching the plungers at feed speed. Since the dog 94$^a$ lies forwardly of the plane of the pointed head 92$^b$ of the plunger 91$^b$, this dog will pass the plunger 91$^b$ and will engage and depress the plunger 91$^a$ so as to shift the control valve back to its rapid approach position as shown in Fig. 5.

The second rapid approach movement will be terminated by engagement of the second feed dog 93$^b$ which approaches and depresses the plunger 91$^b$ to shift the plungers from the positions shown in Fig. 5 to the positions of Fig. 6. At the end of the second feed movement of the support, the rapid return dog 94$^b$ engages and depresses the plunger 91$^b$ to move the plungers from the position shown in Fig. 6 to the position shown in Fig. 7. The support will then be moved to the right at rapid traverse rate until the stop dog 95$^b$ engages and depresses the plunger 91$^b$ to move the valve to one of its end or stop positions. It will be noted that the dog 95$^b$ is in a plane rearwardly of the plunger 91$^a$ and therefore does not engage that plunger during the return movement.

The stop dog 95$^b$ may be pivoted as shown in Figs. 2 and 8 to guard against locking of the control valve in case the table does not overrun sufficiently for the dog 95$^b$ to clear the plunger 91$^b$. This construction also prevents actuation of the plunger 91$^b$ by the dog 95$^b$ after another rapid approach movement has been manually initiated. A similar pivoted construction is also employed in the traverse dog 94$^a$ so as to prevent operation thereof during the rapid return movement.

From the foregoing description it will be apparent that the invention provides a simplified actuating mechanism adapted to be compactly arranged so that it may be contained in a single feed box and that by providing for hydraulically governing the mechanical feeding mechanism, the control means is materially simplified.

I claim as my invention:

1. In a machine tool having a movable support, a feed shaft operatively connected thereto so that said support may be reciprocated by rotation of said shaft in forward and reverse directions, constantly driven mechanical means for rotating said shaft at feeding speed, a clutch for connecting said means to said shaft, hydraulically operated means for shifting said clutch, hydraulic means connected to said shaft for rotating the same at rapid traverse speed in forward or reverse directions, and a unitary valve device connected for controlling both of said hydraulic means operable in one position to render all of said actuating means ineffective, in a second position to drive said support positively at a feed speed and in third and fourth positions to cause the support to be moved in opposite directions at a rapid traverse speed.

2. In a machine tool having a bed with a support reciprocably mounted thereon, the combination of a rotatable feed shaft having an operative connection with said support, mechanical actuating means for rotating said shaft at a feed speed to feed said support, said means embodying a power disconnecting device, hydraulically operated actuating means for rotating said shaft at traverse speeds to traverse said support in forward and reverse directions, and control means for said feed and traverse means including a single control element operatively connected to said hydraulic means and to said disconnecting device and effective in one position to render ineffective both of said actuating means and stop the support, in a second position to render one of said actuating means operative, and in a third position to render the other of said actuating means operative to move the support.

3. In a machine tool having a bed and a support reciprocably mounted thereon, the combination of mechanical means for moving said support at feed speed, said means embodying a movable member for disconnecting and rendering said mechanical means inoperative, hydraulically actuated means for moving said member, hydraulic actuating means for moving said support at a traverse speed in forward and reverse directions, and a control valve connected to both of said hydraulic means and arranged in one position to render said mechanical actuating means effective, in another position to render said hydraulically operated actuating means operative to move said support in one direction, in a third position to render said hydraulically operated actuating means operative to move said support in the reverse direction, and in a fourth position to render said mechanical means and hydraulic means inoperative to move said support.

4. In a machine tool having a bed and a support reciprocably mounted thereon, the combination of a feed box mounted in said bed beneath said support, a feed shaft rotatably mounted in said box and having a driving connection with said support, hydraulic actuating means in said box connected to said shaft for rotating said shaft at a traverse speed, mechanical actuating means for rotating said shaft at a feed speed, said mechanical means embodying a movable member for disconnecting said mechanical means from said shaft, a piston and cylinder device for moving said member, and a control valve connected to said hydraulic means and to said device and arranged in one position to render both of said actuating means inoperative, in a second position to render said mechanical actuating means operative, and in a third position to render said mechanical means inoperative and said hydraulic means operative.

5. A machine tool having in combination, a bed, a support movably mounted thereon, a feed box mounted in said bed, a feed shaft operatively connected to said support and rotatably mounted in said box, gearing in said box for rotating said feed shaft at a feed speed, and embodying a shiftable member for disconnecting said gearing from said shaft, a piston and cylinder device for shifting said member, hydraulically operated actuating means in said feed box for rotating said feed shaft in either direction at traverse speed, and a valve connected to said piston and cylinder device and to said hydraulic means for controlling the operation of said hydraulic means and said gearing and effective in a first position to actuate said piston and drive the support mechanically, and effective in second and third positions on opposite sides of said first position to drive said support by said hydraulically operated means at a traverse speed in forward and reverse directions.

6. In a machine tool having a bed and a support reciprocable thereon, the combination of a feed box removably mounted in said bed beneath said support and projecting forwardly beyond the bed, a feed shaft rotatably journaled in said box and having a driving connection with said support, mechanical driving means mounted in said box for rotating said shaft, said means having a clutch connection with said shaft and having a part extending out of said box for connecting to a power source, hydraulic actuating means in said box for rotating said shaft at traverse speed in forward and reverse directions, hydraulically operated means carried by said box for shifting said clutch, and a valve also carried by said box for controlling all of said hydraulic means and effective in a first position to engage said clutch and render said hydraulic actuating means inoperative, in second and third positions on opposite sides of said first position to disengage said clutch and cause said hydraulic actuating means to traverse the support in forward and reverse directions respectively, and in a fourth position to stop the support, said valve having an operating handle on the front of said box.

7. A machine tool having, in combination, a bed, a support movably mounted thereon, a rotatable feed shaft carried by said bed and having a driving connection with said support, disconnectible mechanical actuating means for rotating said shaft at a feeding speed, hydraulic actuating means for rotating said shaft at rapid traverse speed in forward or reverse directions, the movable elements of said hydraulic means being connected to said shaft, and control mechanism for all of said actuating means including a manually operable device effective in one position to cause said support to be moved positively at feeding speed by said mechanical actuating means, in second and third positions to cause said support to be actuated at traverse speed in forward or reverse directions by said hydraulic means, and in fourth position to stop said support.

8. In a machine tool having a bed and a support movably mounted thereon, the combination of a feed box mounted in said bed beneath said support and projecting beyond the forward side of said bed, a feed shaft rotatably mounted in a vertical position in said box and having a driving connection with said support, a worm wheel loosely mounted in fixed vertical position on said shaft, a clutch element splined on said shaft and engageable with said worm wheel to lock the same to said shaft, mechanical means including a worm for constantly rotating said worm wheel, rotatable hydraulic means within said feed box for rotating said shaft in forward or reverse directions at rapid traverse speed, a valve carried by said feed box and operable from the forward side thereof to control said hydraulic means, and means connected to said valve operative when said valve is moved to one position to engage said clutch and when said valve is in other positions to disengage said clutch.

9. A machine tool comprising, in combination, a bed, a support movably mounted thereon, a feed shaft rotatably mounted beneath said support and having a geared operating connection therewith, mechanical driving means for said shaft including a clutch through which said feed shaft may be rotated at feeding speed, hydraulic actuating means for rotating said feed shaft at traverse speed, said hydraulically operated actuating means being operatively connected to said shaft, hydraulically operated means for shifting said clutch, and a control valve for both of said hydraulic means arranged in one position to cause disengagement of said clutch and operation of said hydraulic actuating means, whereby to cause traverse movement of said support, said valve being arranged in a second position to render said hydraulic actuating means ineffective and disengage said clutch so that said support will remain stationary, and arranged in a third position to render said hydraulic actuating means ineffective and engage said clutch to cause feeding movement of the support.

10. The combination with a machine tool having a bed and a reciprocable support thereon, of actuating means for said support comprising disconnectible mechanical means for moving said support at a feed speed in a forward direction, hydraulically operated means governing the connection of said mechanical means, hydraulic actuating means for moving said support at traverse speed in forward and reverse directions, a control device for said actuating means comprising a valve connected to and governing the operation of both of said hydraulic means and a movably mounted trip device, and trip dogs moving in timed relation to the movement of said support for actuating said trip device.

11. A machine tool comprising, in combination, a bed, a support reciprocably mounted thereon, mechanical actuating means for moving the support at a feed speed in one direction, hydraulically actuated means for moving said support at a traverse speed in forward and reverse directions, and means including a single automatically operable control device for controlling the operation of both the hydraulic and mechanical actuating means, a first dog on said support effective when said support is moving at traverse speed in a forward direction to shift said device and cause the support to be actuated by said mechanical means, a second dog on said support operable at the end of the forward movement to shift said device and cause said hydraulically actuated means to return the support at a traverse rate, and a third dog on said support effective to actuate said device at the end of the return movement of the support to stop the support.

12. A machine tool comprising, in combination, a bed, a support mounted for reciprocation thereon, a feed box in said bed, mechanical actuating means mounted in said box for moving said support at feed speed, hydraulically actuated means in said box operable to move said support at a traverse speed, means operatively connecting said mechanical and hydraulic actuating means to said support, means including a single control device mounted on said box operable to control both the hydraulic and the mechanical actuating means and effective in one position to cause said support to be actuated at a feed speed by said mechanical means, in another position to be actuated at a traverse speed by said hydraulic means, and in a third position to stop the support, and trip dogs carried on said support arranged to engage said control device to shift said device from one position to another.

13. In a machine tool having a bed and a movable support, the combination of a feed box mounted in the bed so as to extend forwardly beyond the side of said support, a pair of parallel horizontal shafts extending from front to rear in said box one above the other and journaled in the walls of the box adjacent one side thereof, both of said shafts having splined ends projecting through the forward wall of said box, intermeshing change gears on said ends, one of said shafts also extending through the rear wall of the box for connection to a power source, a worm on the other of said shafts adjacent said rear wall, a vertical feed shaft journaled in said box and projecting through said top thereof and operatively connected to said support, said feed shaft being positioned between said horizontal shafts and the remote side of the box and having a worm wheel loosely mounted thereon in engagement with said worm, a clutch splined on said feed shaft and movable into driving engagement with said worm, a reversely operable hydraulically actuated motor mounted in said box about said feed shaft, hydraulically actuated means carried by said box for shifting said clutch, and a control valve in the feed box for controlling said motor and said hydraulic means.

14. A feed box for machine tools, a pair of parallel horizontal shafts journaled in opposite walls of the box adjacent another wall thereof, both of said shaft having splined ends projecting through a first one of said opposite walls of the box, intermeshing change gears on said ends, the other end of one of said shafts extending through the second one of said opposite walls for connection to a power source, a worm on the other one of said shafts, a feed shaft perpendicular to said pair of shafts and journaled in another opposite pair of said walls and projecting through one of said other pair of walls for connection with a movable support, said feed shaft having a worm wheel loosely mounted thereon in engagement with said worm, a clutch splined on said feed shaft and movable into driving engagement with said worm wheel, a reversely operable hydraulically actuated motor mounted in said box about said feed shaft, hydraulically actuated means carried by said box for shifting said clutch, and a control valve in said box for controlling said motor and said hydraulic means.

15. A feed box for machine tools having a pair of parallel horizontal shafts extending from front to rear in said box and journaled in the walls thereof adjacent one side wall of the box, intermeshing speed reducing gears connecting said shafts, one end of one of said shafts extending through the rear wall of the box for connection to a power source, a worm on the other one of said shafts adjacent said rear wall, a vertical feed shaft journaled in said box and projecting through said top thereof for operative connection to a movable support, said feed shaft having a worm wheel loosely mounted thereon in engagement with said worm, a clutch splined on said feed shaft and movable into driving engagement with said worm, a reversely operable hydraulically actuated motor mounted in said box about said shaft, and hydraulically actuated means carried by said box for shifting said clutch.

GUSTAF DAVID SUNDSTRAND.